(12) United States Patent
Hägebarth

(10) Patent No.: US 6,977,923 B1
(45) Date of Patent: Dec. 20, 2005

(54) METHOD OF ACTIVATING AN INACTIVE TERMINAL OF A DATA NETWORK, PARTICULARLY OF AN IP NETWORK

(75) Inventor: Frank Hägebarth, Kirchheim (DE)

(73) Assignee: Alcatel, Paris (FR)

(*) Notice: Subject to any disclaimer, the term of this patent is extended or adjusted under 35 U.S.C. 154(b) by 679 days.

(21) Appl. No.: 09/676,675

(22) Filed: Oct. 2, 2000

(30) Foreign Application Priority Data

Oct. 19, 1999 (DE) ............................. 199 50 231

(51) Int. Cl.⁷ .................. H04L 12/66; H04L 12/28; H04L 12/50; H04L 12/56
(52) U.S. Cl. .................. 370/353; 370/359; 370/384; 370/419
(58) Field of Search ................ 370/235, 236, 370/351, 352, 353, 357, 359, 386, 389, 392, 370/395.1, 395.2, 395.3, 395.5, 464–467, 370/395.52, 384, 419

(56) References Cited

U.S. PATENT DOCUMENTS

| | | | |
|---|---|---|---|
| 5,566,163 A * | 10/1996 | Petit | 370/230 |
| 5,809,128 A * | 9/1998 | McMullin | 370/352 |
| 6,065,118 A * | 5/2000 | Bull et al. | 713/200 |
| 6,085,080 A * | 7/2000 | Rahikainen et al. | 455/403 |
| 6,104,716 A * | 8/2000 | Crichton et al. | 370/401 |
| 6,661,785 B1 * | 12/2003 | Zhang et al. | 370/352 |

* cited by examiner

*Primary Examiner*—Hassan Kizou
*Assistant Examiner*—Gregory Sefcheck
(74) *Attorney, Agent, or Firm*—Sughrue Mion, PLLC

(57) ABSTRACT

The invention relates to a method of establishing a voice call between a calling party's terminal (5), which is connected to a telephone network (4), and a called party's terminal (6), which is also connected to the telephone network (4), through an Internet Protocol (IP) network (1). To make the method as simple as possible, it is proposed to use conventional IP servers (2; 3) of IP service providers for providing access to the IP network (1). The IP network (1) includes at least one Voice-over-IP (VoIP) server (11), which controls the functions of telephony over the IP network (1). The VoIP server (11) receives the request for an IP call from the calling party, activates the still inactive terminal (6) of the called party over the telephone network (4), determines the IP addresses of the terminals (5, 6), and communicates the IP addresses to the respective other terminal (5; 6). The terminals (5, 6) then establish a voice call between them through the IP network (1).

26 Claims, 3 Drawing Sheets

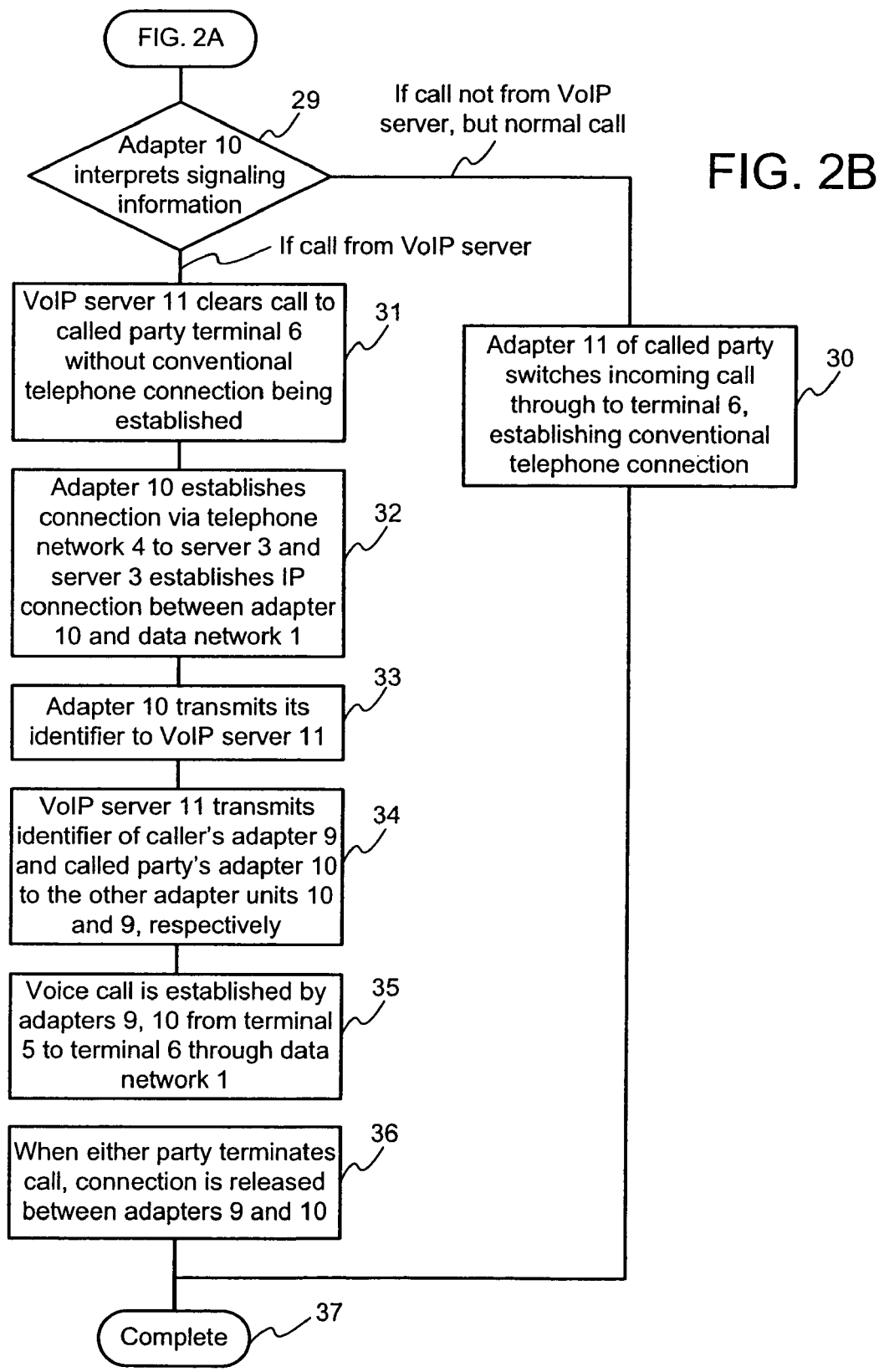

METHOD OF ACTIVATING AN INACTIVE TERMINAL OF A DATA NETWORK, PARTICULARLY OF AN IP NETWORK

BACKGROUND OF THE INVENTION

The present invention relates to a method of activating an inactive terminal of a data network, which terminal is connected to a telephone network, for establishing a connection through the data network between a further terminal and the terminal to be activated. The invention also relates to a server of a data network, to an adapter unit connected between a terminal of a telephone network and the telephone network, to a telephone, and to a microcomputer, preferably a personal computer, comprising a modulator-demodulator (modem) or an ISDN adapter.

The present invention relates to the field of telephony over data networks, particularly to the field of telephony over Internet Protocol (IP) networks, so-called Internet telephony.

It is known in the art to use IP networks (e.g., the Internet or intranets) for telephony. Internet telephony, also referred to as "Voice over IP" (VoIP), is expected to find wide use, because it provides considerable cost savings over conventional telephone calls through the telephone network, particularly in the case of long-distance and international calls. For VoIP, both the calling party and the called party must have terminals with Internet access. To be able to make a call through an IP network, both terminals must be connected to the Internet. Connections between the terminals and the Internet are commonly established through the telephone network at the local call rate. The actual long distance between the calling party and the called party, which is very expensive in the case of a conventional voice call over the telephone network, is covered via the IP network, in which rates are generally very low.

There are various methods for carrying out VoIP. An essential difference between the methods lies in the type of terminals used. Frequently, use is made of multimedia-capable personal computers (PCs) on which suitable software for transmitting speech data over the IP network is installed. This permits telephony from PC to PC via an IP network. Using suitable compression techniques, the amount of data to be transmitted over the IP network can be reduced to about 8 to 12 kb/s. If sufficient bandwidths are available, speech quality is acceptable and corresponds to that in mobile radio networks.

In PC-to-PC telephony, however, the circle of users is greatly limited, since a large number of potential users of Internet telephony do not have a PC or a suitably equipped PC. Therefore, Internet telephony solutions are being offered in which an interface from a conventional telephone network to an IP network is implemented using a so-called gateway. This permits VoIP between a PC and a conventional telephone (analog or ISDN) or even between two telephones.

In Internet telephony via gateways, the calling party dials the number of a first gateway, which is located as close to the caller as possible. The connection to the gateway is established through the conventional telephone network. Next, the calling party dials the number of the desired party. The first gateway then establishes an IP connection through an IP network to a second gateway, which is closest to the called party. From the second gateway, a conventional telephone connection is then established to the called party.

In the prior art, providers of Internet telephony must maintain a gateway in as many local networks as possible so as to enable users of Internet telephony to access the IP networks nationwide at the lowest possible rate (the local rate). However, the installation and maintenance of the gateways is very expensive and nullifies most of the cost advantages offered by Internet telephony. This is one of the main reasons why Internet telephony has not yet become accepted.

SUMMARY OF THE INVENTION

It is therefore an object of the present invention to improve a method of the above kind so that a voice call can be established between the terminal of a calling party and the terminal of a called party over a data network, particularly over an Internet Protocol (IP) network. Another object of the present invention is to provide a method of the above kind whereby the inactive terminal can be activated in a simple manner. To attain these objects, the invention, starting from the method of activating an inactive terminal of the above kind, provides a method which is characterized by the following steps:

establishing a connection to a server of the data network and transmitting an identifier of the terminal to be activated to the server of the data network;

receiving the identifier at the server of the data network;

interpreting the identifier at the server of the data network to determine the number of the terminal to be activated;

making a call from the server of the data network through the telephone network to the terminal to be activated;

signaling the identity of the server of the data network;

receiving the call and interpreting the signaling at the terminal to be activated;

terminating the call to the terminal by the server of the data network; and establishing a connection from the terminal to be activated to the data network if the signaling indicates that the call came from a server of the data network.

The present invention assumes that a terminal connected to a telephone network is to be activated.

The terminal can establish a connection to a data network through the telephone network. The data network is preferably a Transmission Control Protocol/Internet Protocol (TCP/IP) network, the so-called Internet or a so-called intranet. The terminal cannot be addressed and activated directly from the data network. According to the invention, therefore, a method of indirectly activating the terminal in a simple manner and at low cost is proposed.

First, a connection is established from a terminal referred to herein as a further terminal to the data network via an access node of a data network provider (e.g., an Internet Service Provider), a so-called point of presence (POP). For telephone communication over the data network (e.g., Internet telephony), the further terminal wants to establish a call to the terminal to be activated. The server of the data network is designed as a Voice-over-IP server (VoIP server), for example. The VoIP server is contained in the data network and is also connected to the telephone network. It is a server that can establish telephone calls over the telephone network and transmit data over a data connection. This VoIP server receives from the further terminal over the data network or via another server an identifier of the terminal to be activated.

The identifier is received and interpreted by the VoIP server of the data network. The interpretation of the identifier includes determining the number of the terminal to be activated. To accomplish this, the VoIP server has access to a database, for example, in which at least the identifiers and numbers of a plurality of terminals are stored. It is also conceivable, however, that as the identifier, the number of the terminal to be activated is transmitted. In that case, the interpretation of the identifier and the determination of the number of the terminal to be activated are limited to the transfer of the received number.

Next, the VoIP server of the data network transmits a call over the telephone network to the terminal to be activated, thus signaling to the terminal its own identity. The identity of the server is, for example, its number, which is transmitted automatically in modern telephone networks. The signaling information is transmitted in the D channel in the case of an ISDN telephone and as calling line identification presentation (CLIP) information in the case of an analog telephone. The terminal to be activated receives the call and interprets the signaling information or the number of the caller. If the number of a VoIP server is recognized, the call will not be accepted. To recognize the number of a VoIP server, the calling number transmitted with the call is compared with a list of numbers of known VoIP servers stored in the terminal to be activated.

Next, the VoIP server terminates the call to the terminal to be activated, without a chargeable telephone call being established from the server to the terminal to be activated. For this reason, the call from the VoIP server to the terminal to be activated can also be made over a long distance without any telephone charge having to be paid. It is not necessary that a VoIP server should be available in every local network, as is the case in the prior art. In the method according to the invention, the number of servers required is determined by the usage of the individual VoIP servers. The servers may be positioned in arbitrary locations and must only be connected to the data network and the telephone network.

Next, the terminal to be activated establishes a connection to the data network via a further POP if the signaling information or the received number indicates that the caller was a VoIP server of the data network. To do this, the terminal to be activated dials the number of a further, nearby POP server of the data network over the telephone network and establishes a connection to this POP server. The POP server can then establish, for example, a connection through the data network to the VoIP server from which the activation of the terminal originated.

The VoIP server now has a data network connection, e.g., an IP connection, to both terminals. It determines the IP addresses of the two terminals and notifies each terminal of the IP address of the respective other terminal. The two terminals terminate the IP call to the VoIP server and establish a direct connection between them.

The servers of the data network of the method according to the invention have two main functions. On the one hand, dialing into the data network from a terminal over the telephone network is made possible (POP server). On the other hand, the call to the terminal to be activated can be made over the telephone network, and by transmitting the signaling information or the number of the server, an incoming VoIP call can be signaled (VoIP server) to the terminal over the telephone network. It is conceivable that the two main functions of the servers could be performed on two different servers. One of the servers would be a conventional POP server of a data network that performs the first function. The other server would be a novel VoIP server that performs the second function. The two servers could communicate with each other over the data network. It is also possible to implement both main functions with a single server. In a preferred embodiment of the present invention, the establishment of the connection to the server of the data network and the transmission of the identifier of the terminal to be activated to the server of the data network are effected by the further terminal. To accomplish this, the further terminal establishes a connection to the VoIP server of the data network via a POP server. The terminal to be activated can then establish a connection to the VoIP server of the data network via the POP server. Both terminals receive the IP address of the respective other terminal from the VoIP server over the data network, and establish a direct connection between them through the telephone network, the data network, and the POP servers involved.

If the data network provider has dial-in servers (POP servers) in the local networks of the further terminal and of the terminal to be activated, only the local rate will have to be paid for the call for dialing from the two terminals into the data network via the servers. As a rule, the call through the data network is free of charge or much lower in cost than a corresponding call through the telephone network.

In the Internet, the dial-in servers (POP servers) are made available and operated by so-called Internet Service Providers. In each local network, access is generally provided to one or more POP servers. According to the present invention, the connection from the terminal to the VoIP server and to the respective other terminal can be established via POP servers of arbitrary Internet Service Providers. Thus, the calls from the terminals over the telephone network to the POP server can, as a rule, be made at the local call rate or at a special Internet rate of a data network provider without the provider of an Internet telephony service (VoIP service) himself having to run a POP server.

In another preferred embodiment of the present invention,
the terminal to be activated establishes a connection to a server of the data network and transmits its identifier to the server or the identifier is determined by the server;
the data network addresses of the two terminals are transmitted by the server of the data network to the respective other terminal, or are retrieved by the terminals from the VoIP server; and
a connection is established by the terminals through the telephone network and the data network.

The data network is advantageously designed as an Internet Protocol (IP) network. Such a data network is also referred to as an intranet or the Internet.

In a further preferred embodiment of the present invention, the further terminal is a calling party's terminal connected to a telephone network, and the terminal to be activated is a called party's terminal connected to the telephone network, the called party's terminal being activated to set up a voice call between the calling party's terminal and the called party's terminal through the IP network.

For the establishment of a voice call between the calling party's terminal and the called party's terminal, in yet another preferred embodiment of the present invention, a method is proposed which is characterized by the following steps:
The calling party dials at his or her terminal the number of the called party's terminal;
a first Voice-over-IP (VoIP) adapter unit, connected between the calling party's terminal and the telephone network, receives the dialed number;
the first VoIP adapter unit establishes a connection through the telephone network to a POP server and through the latter to the data network;
the first VoIP adapter unit transmits the called-party number and its own IP address over the IP network to a VoIP server of the data network;

the VoIP server receives the called-party number and the IP address of the first VoIP adapter unit;

the VoIP server dials up the called party's terminal through the telephone network;

over the telephone network, the number of the VoIP server is signaled to the called party's terminal;

a second VoIP adapter unit, connected between the called party's terminal and the telephone network, receives the number of the VoIP server;

the second VoIP adapter unit compares the number with the numbers of known VoIP servers;

the second VoIP adapter unit identifies the VoIP server and prevents the incoming call from being transferred to the called party's terminal;

the second VoIP adapter unit establishes a connection to a POP server through the telephone network;

the second VoIP adapter unit transmits its IP address to the VoIP server over the IP network;

the VoIP server transmits the IP address of the first VoIP adapter unit and the IP address of the second VoIP adapter unit to the respective other VoIP adapter unit;

an IP connection is established from the first VoIP adapter unit to the second VoIP adapter unit;

the second VoIP adapter unit causes a call to be sent to the called party's terminal; and a voice call is established between the calling party's terminal and the called party's terminal if the called party accepts the call.

In this embodiment of the present invention, the two main functions of the servers of the data network are divided between two servers. The POP server performs the function of a conventional access server of a data network, the dialing from a terminal into the data network over the telephone network. Through the VoIP server, the call to the terminal to be activated and the signaling information can be transmitted over the telephone network. The POP server and the VoIP server are interconnected through the data network (in the present case through the IP network).

Alternatively, it is proposed to combine the VoIP server and the POP server in a common POP/VoIP server.

Another object of the present invention to improve a server of a data network so as to permit a simple activation of an inactive terminal of a data network.

To attain this object, the invention provides a server of a data network which is characterized by means for receiving from a terminal an identifier of a terminal to be activated, which is connected to a telephone network;

means for making a call over the telephone network to the terminal to be activated; and means for terminating the call to the terminal to be activated.

Through a server of such a design, the call to the terminal to be activated can be made over the telephone network. Present-day telephone networks transmit the number of the server to the terminal to be activated. The terminal to be activated compares the received number with the numbers of known servers of the data network. If it is found that an incoming call comes from a server of the data network, the call will not be accepted. This makes it possible to activate a particular inactive terminal of a data network in a simple manner without the service provider or the user of the terminal incurring any telephone charges by the activation.

In still another preferred embodiment of the present invention, the server is designed as an access server (POP server) of an IP network.

Advantageously, the server comprises means for interpreting the identifier and determining the number of the terminal to be activated.

In yet another preferred embodiment, the server comprises means for accepting a call over a telephone network from a terminal connected to the telephone network, and means for establishing a connection from the terminal to the data network. This makes it possible to use the server according to the invention for establishing a call between the terminal of a calling party and the terminal of a called party through a data network, particularly through an Internet Protocol (IP) network.

Yet another object of the present invention is to improve an adapter unit of the above kind so that any inactive terminal of a data network, particularly a telephone, can be activated in a simple manner.

To attain this object, the invention, starting from an adapter unit of the above kind, provides an adapter unit which is characterized by means for establishing a connection from the terminal to a server (e.g., a POP server) of a data network through the telephone network;

means for receiving the call of a server (e.g., a VoIP server) of the data network;

means for interpreting the number of a caller;

means for comparing the number with the numbers of known servers (e.g., VoIP servers) of the data network;

means for retrieving and/or receiving a data network address of a further adapter unit of the caller from the server (e.g., VoIP server) of the data network; and means for establishing a data call to the further adapter unit through the data network.

According to an advantageous aspect of the present invention, the adapter unit comprises means for transmitting the identifier of a terminal to be activated or the identification of a called party to the server of the data network. The identifier or identification transmitted is, for example, the number of the terminal to be activated. In this way, the unit according to the invention can be used to activate any terminal.

A terminal initiates the activation of any inactive terminal in the manner described above. In a preferred embodiment of the present invention, the adapter unit comprises means for transmitting the identifier of the terminal to which it is connected to the server of the data network. This makes it possible to establish a connection from the activated terminal through the adapter unit to the sever of the data network and to transmit the identifier of the activated terminal to the server. The server will then establish a connection between the terminal that initiated the activation and the activated terminal through the data network.

Advantageously, the adapter unit is implemented as a microcomputer with a processor, a memory, an interface to the telephone network, and an interface to an Internet Protocol (IP) network. The memory of the adapter unit holds, for example, the identities, particularly the IP addresses, of particular servers of the data network. When a call is received by the adapter unit, and signaling information with the identity of the caller is transmitted, the unit can compare the identity of the caller with the stored identities of the servers of the data network to determine whether the caller is a server of the data network. The adapter unit acts toward the data network like a computer with a modem or an ISDN adapter, and towards the terminal like a conventional telephone line socket.

According to the present invention, the adapter unit may be designed as a separate device that is connected between the terminal and the telephone network, preferably between the terminal and the telephone line socket. It is also conceivable that the adapter unit could form part of a terminal. For this purpose, on the one hand, a telephone is proposed which incorporates an adapter unit as claimed in any one of claims 12 to 14. On the other hand, a computer with a modulator-demodulator (modem) or with an ISDN adapter is proposed, the modem or the ISDN adapter incorporating an adapter unit as claimed in any one of

BRIEF DESCRIPTION OF THE DRAWINGS

A preferred embodiment of the present invention will now be explained in greater detail with reference to the accompanying drawings, in which:

FIGS. 2A and 2B are a flowchart for the method in accordance with the invention.

DETAILED DESCRIPTION OF THE INVENTION

Figure 1:
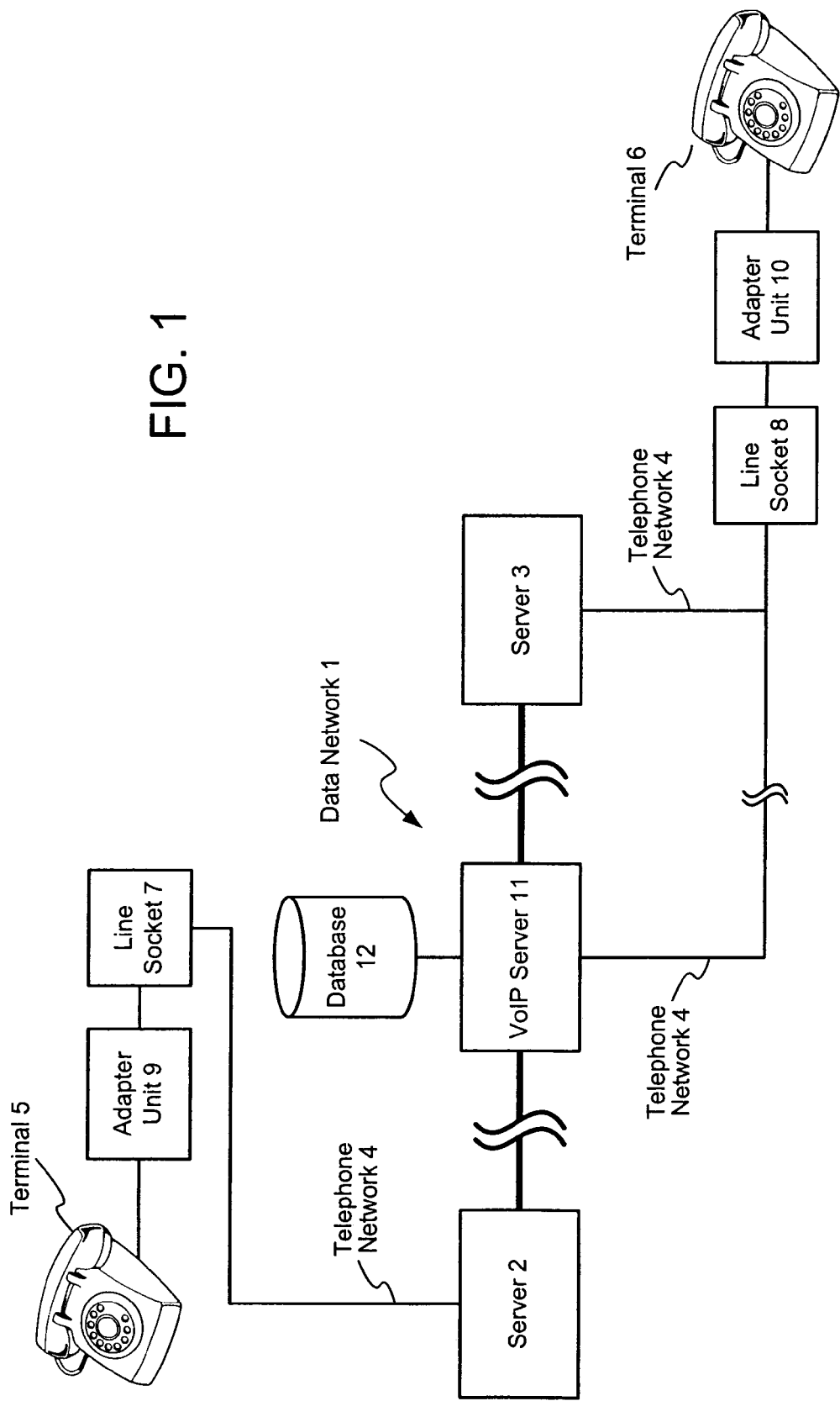
FIG. 1 shows apparatus for carrying out the method of establishing a call between a calling party's terminal and a called party's terminal in accordance with the invention.

In FIG. 1, a data network designed as an Internet Protocol (IP) network, particularly the Internet, is generally referenced by the numeral 1. Data network 1 includes point-of-presence (POP) servers 2, 3, i.e., access nodes of a data network provider. The connections between servers 2, 3 in data network 1 are represented by heavy lines. Servers 2, 3 are connected with terminals 5, 6 through a telephone network 4, the terminals being conventional telephones. The function of servers 2, 3 is to permit dialing from terminals 5, 6 into data network 1 through telephone network 4.

Terminals 5, 6 are connected to telephone network 4 through conventional telephone line sockets 7, 8. Connected between terminals 5, 6 and telephone line sockets 7, 8 are adapter units 9, 10, which are either designed as separate units or incorporated in terminals 5, 6. Their construction and operation are described below.

Data network 1 is a long-distance network, particularly a worldwide network, which is indicated in FIG. 1 by the interruptions of the connections of data network 1. Data network 1 further includes a Voice-over-Internet Protocol (VoIP) server 11, which is connected to servers 2, 3 and to telephone network 4. The construction and operation of server 11 are described below.

A subject matter of the present invention is the below-described method of establishing a call between the terminal 5 of a calling party and the terminal 6 of a called party through the data network 1. Further subject matters of the present invention are the adapter units 9, 10 and the VoIP server 11.

Figure 2A:
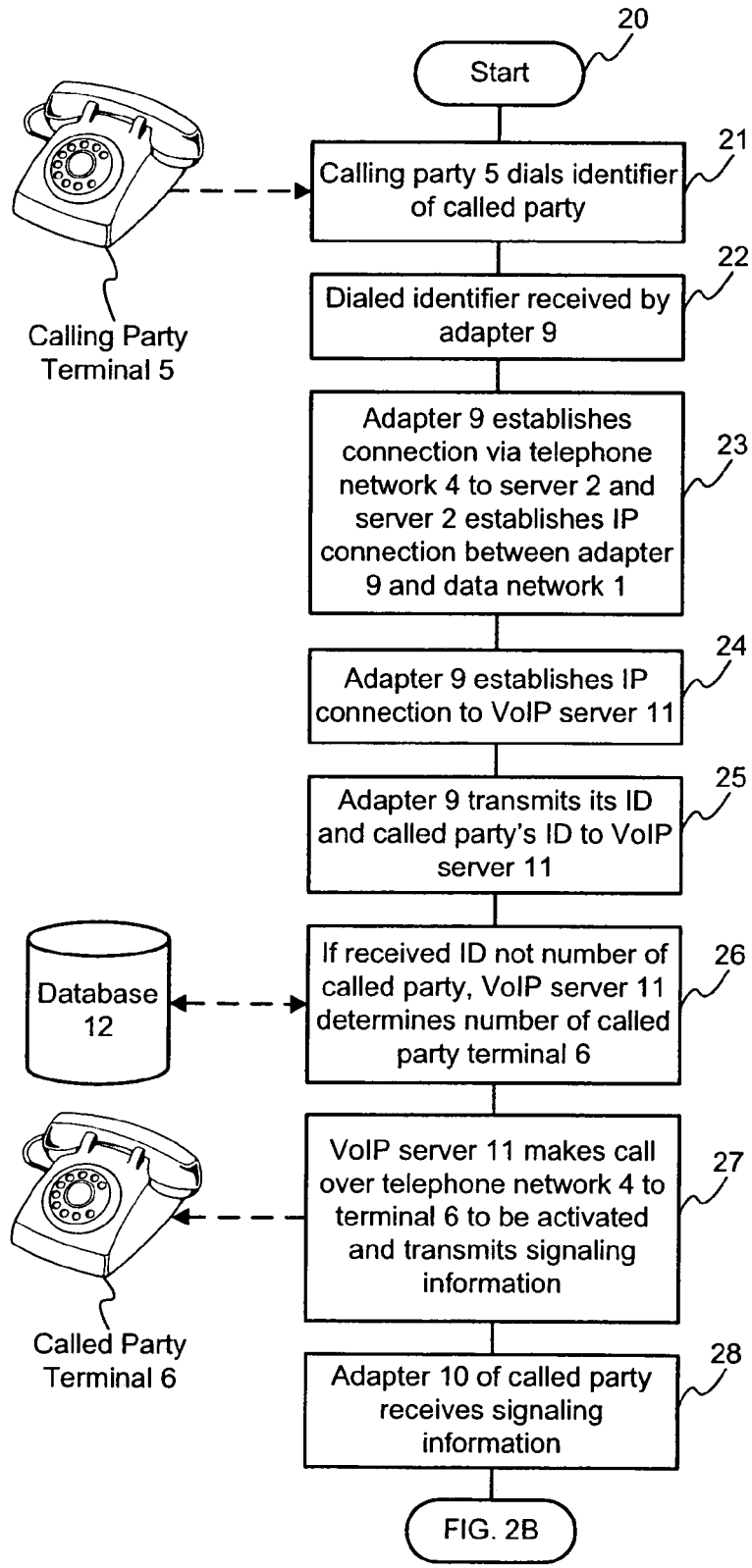

To describe the method according to the invention, reference will now be made to FIG. 2. There, the start of the method is represented by block 20. In block 21, a calling party (not shown) dials at his or her terminal 5 the identifier, or number, of the terminal 6 of another party, the called party. In block 22, the dialed identifier is received by adapter unit 9. Then, in block 23, adapter unit 9 establishes a connection through telephone network 4 to server 2. Server 2 establishes an IP connection between adapter unit 9 and data network 1. In block 24, adapter unit 9 establishes an IP connection to VoIP server 11 through telephone network 4, server 2, and data network 1. In block 25, adapter unit 9 transmits its identification, e.g., its IP address, and the called party's identification to VoIP server 11.

VoIP server 11 receives the identification. If the received identification is not the number of a called party, it will be interpreted in block 26 to determine the number of the terminal 6 of the called party. It is conceivable that VoIP server 11 could have access to a database 12 in which information about subscribers of telephone network 4 is stored. Then, in block 27, VoIP server 11 makes a call over telephone network 4 to the terminal 6 to be activated and transmits signaling information to terminal 6. The signaling information contains the identity, particularly the number, of server 11. In the case of a digital terminal 6 based on the ISDN standard, the signaling information is transmitted over the D channel of telephone network 4; in the case of an analog terminal 6, it is transmitted as calling-line-identification-presentation (CLIP) information.

Adapter unit 10 receives the signaling information in block 28 and interprets it in block 29. From the received identity of the server 11, adapter unit 10 can determine whether the caller is a VoIP server 11 of data network 1. It is conceivable that a memory of the adapter unit could contain the identities of all VoIP servers 11 of the data network. The identities of VoIP servers 11 could be updated on each call establishment. If adapter unit 10 determines that the call is not from a VoIP server 11 of data network 1, but a normal call over telephone network 4, it will switch the incoming call through to terminal 6 and permit the establishment of a conventional telephone connection (block 30).

If the call is from VoIP server 11, the latter, after transmitting the signaling information, will clear the call to terminal 6 in block 31 without a telephone connection having been established between VoIP server 11 and terminal 6 through telephone network 4 and without any costs having been incurred by the use of the telephone network. Then, in block 32, adapter unit 10 establishes a connection through telephone network 4 to a server 3 located as close to terminal 6 as possible, preferably in the local network. Also in block 32, server 3 establishes an IP connection between adapter unit 10 and data network 1. In block 33, adapter unit 10 transmits its identifier, particularly its IP address, via telephone network 4, server 3, and data network 1 to VoIP server 11. In block 34, VoIP server 11 transmits the identifiers of the caller's adapter unit 9 and the called party's adapter unit 10 to the other adapter units 10 and 9, respectively. Then, in block 35, a voice call is established by adapter units 9, 10 from the calling party's terminal 5 to the called party's terminal 6 through data network 1, so that the calling party and the called party can communicate with one another.

As soon as one of the two, the calling party or the called party, signals, for example by pressing a key, that he or she wants to terminate a call, the connection is released by a connected adapter unit 9; 10 in block 36. In block 37, the process is complete.

The connections from terminals 5, 6 to servers 2, 3 of the data network are established through telephone network 4, preferably at the local rate. The long distance between the calling party and the called party, which is very expensive in the case of a conventional voice call over the telephone network, is covered in the method according to the invention via the generally low-charge data network 1. The provider of the telephone service over data network 1 need not maintain a server 11 in every local network to enable the calling party or the called party to access data network 1 at the lowest possible cost. The method according to the invention takes advantage of the infrastructure of a provider (access provider) of data network 1. Since data networks 1, particularly the Internet, enjoy great popularity, there are relatively many providers of access to data networks 1. Thus, access to data network 1 is possible from nearly all local networks at the local rate.

The interpretation of the identifier of the called party's terminal 6 in block 26 may comprise a check as to whether the called party is a customer of the provider of telephony over data network 1 (e.g., of Internet telephony) at all, and as to whether he or she has an adapter unit 10. It is conceivable that the information about subscribers of telephone network 4 stored in database 12 could include information as to whether the subscribers are customers of the Internet telephony service provider. If the called party is not a customer of the service provider, no call can be established to him or her through data network 1. VoIP server 11 will communicate this to adapter unit 9. Adapter unit 9 will then initiate the establishment of a conventional voice call through telephone network 4 to the called party's terminal 6.

What is claimed is:

1. A method of activating an inactive terminal (6) of a data network (1), which terminal is connected to a telephone network (4), for establishing a connection through the data network (1) between a further terminal (5) and the terminal (6) to be activated, comprising:
    establishing a connection to a server (1) of the data network (1) and transmitting an identifier of the terminal (6) to be activated to the server (11) of the data network (1);
    receiving the identifier at the server (11) of the data network (1);
    interpreting the identifier at the server (11) of the data network (1) to determine the telephone number of the terminal (6) to be activated;
    making a telephone call from the server (11) of the data network (1) through the telephone network (4) to the terminal (6) to be activated;
    signaling the identity of the server (11) of the data network through the telephone network (4) to the terminal (6) to be activated;
    receiving the telephone call and interpreting the signaling at the terminal (6) to be activated;
    terminating the telephone call to the terminal (6) by the server (11) of the data network (1); and
    establishing a connection from the terminal (6) to be activated to the data network (1) if the signaling indicates that the telephone call came from a server (11) of the data network (1),
    wherein the terminal to be activated is a terminal which has not yet established a connection through the data network.

2. A method as claimed in claim 1, characterized in that the establishment of the connection to the server (11) of the data network (1) and the transmission of the identifier of the terminal (6) to be activated to the server (11) of the data network (1) are effected by the further terminal (5).

3. A method as claimed in claim 1, characterized in that, in order to establish a connection between the further terminal and the terminal to be activated,
    the terminal (6) to be activated establishes a connection to a server (11) of the data network (1) and transmits its identifier to the server (11) or the identifier is determined by the server (11);
    the data network addresses of the two terminals (5, 6) are transmitted by the server (11) of the data network to the respective other terminal (5; 6), or are retrieved by the terminals (5, 6) from the server (11); and
    a connection is established by the terminals (5, 6) through the telephone network (4) and the data network (1).

4. A method as claimed in claim 1, characterized in that the data network (1) is designed an as Internet Protocol (IP) network.

5. A method as claimed in claim 4, characterized in that the further terminal (5) is a calling party's terminal (5) connected to a telephone network (4), and in that the terminal (6) to be activated is a called party's terminal (6) connected to the telephone network (4), the called party's terminal (6) being activated to set up a voice call between the calling party's terminal (5) and the called party's terminal (6) through the IP network (1).

6. A method as claimed in claim 5, characterized by the following steps:
    The calling party dials at his or her terminal (5) the telephone number of the terminal (6) of the called party;
    a first Voice-over-IP (VoIP) adapter unit (9), connected between the terminal (5) of the calling party and the telephone network (4), receives the dialed telephone number;
    the first VoIP adapter unit (9) establishes a connection through the telephone network (4) to a POP server (2) and through the latter to the data network (1);
    the first VoIP adapter unit (9) transmits the called-party telephone number and its own IP address over the IP network (1) to a VoIP server (11) of the data network (1);
    the VoIP server (11) receives the called-party telephone number and the IP address of the first VoIP adapter unit (9);
    the VoIP server (11) dials up the terminal (6) of the called party through the telephone network (4);
    over the telephone network (4), the telephone number of the VoIP server (11) is signaled to the terminal (6) of the called party;
    a second VoIP adapter unit (10), connected between the terminal (6) of the called party and the telephone network (4), receives the telephone number of the VoIP server (11);
    the second VoIP adapter unit (10) compares the telephone number with telephone numbers of known VoIP servers;
    the second VoIP adapter unit (10) identifies the VoIP server (11) and prevents the incoming call from being transferred to the terminal (6) of the called party;
    the second VoIP adapter unit (10) establishes a connection to a POP server (3) through the telephone network (4);
    the second VoIP adapter unit (10) transmits its IP address to the VoIP server (11) over the IP network (1);
    the VoIP server (11) transmits the IP address of the first VoIP adapter unit (9) to the second VoIP adapter unit (10), and the VoIP server (11) transmits the IP address of the second VoIP adapter unit (10) to the first VoIP adapter unit (9);
    an IP connection is established from the first VoIP adapter unit (9) to the second VoIP adapter unit (10);
    the second VoIP adapter unit (10) causes a telephone call to be sent to the terminal (6) of the called party; and
    a voice call is established between the terminal (5) of the calling party and the terminal (6) of the called party if the called party accepts the telephone call.

7. A method as claimed in claim 6, characterized in that the VoIP server (11) and the POP server (2; 3) are combined in a common POP/VoIP server.

8. The method of activating an inactive terminal according to claim 1, wherein, the terminal to be activated is a terminal which has not yet established a connection through the telephone network.

9. The method of activating an inactive terminal according to claim 1,
wherein, the connection from the terminal to be activated to the data network is established after terminating the telephone call to the terminal by the server of the data network.

10. A server (11) of a data network, comprising:
means for receiving from a terminal (5) an identifier of a terminal (6) to be activated, which is connected to a telephone network (4);
means for making a telephone call over the telephone network (4) to the terminal (6) to be activated; and
means for terminating the telephone call to the terminal (6) to be activated,
wherein the terminal to be activated establishes a connection to the data network if signaling indicates that the telephone call came from a server (11) of the data network, and
wherein, the terminal to be activated is a terminal which has not yet established a connection through the data network.

11. A server (11) as claimed in claim 10, characterized in that it is designed as an access server (2; 3) of an IP network (1).

12. A server (11) as claimed in claim 10, further comprising means for interpreting the identifier and determining the telephone number of the terminal (6) to be activated.

13. A server (11) as claimed in claim 10, characterized in that the server (2, 3, 11) further comprises means for accepting a telephone call received from the terminal (5) over the telephone network (4), and means for establishing a connection from the terminal (5) to the data network (1).

14. The server of a data network according to claim 10, wherein, the terminal to be activated is a terminal which has not yet established a connection through the telephone network.

15. An adapter unit (9) connected between a terminal (5; 6) of a telephone network (4) and the telephone network (4), comprising:
means for establishing a connection from the terminal (5) to a server (2; 3) of a data network (1) over the telephone network (4);
means for receiving a telephone call of a server (11) of the data network (1);
means for interpreting a telephone number of a caller;
means for comparing the telephone number of the caller with the telephone numbers of known servers of the data network;
means for retrieving and/or receiving a data network address of a further adapter unit (10; 9) from the server of the data network (1); and
means for establishing a data call to the further adapter unit (10; 9) through the data network (1),
wherein, the adapter unit further comprises means for identifying that the call is arriving from the server of the data network and for preventing the telephone from receiving the call at the telephone until the adapter unit and the further adapter unit establish a connection through the data network by identifying network address of the further adapter unit.

16. An adapter unit (9; 10) as claimed in claim 15, further comprising means for transmitting the identifier of a terminal (6) to be activated or the identification of a called party to the server (2; 3) of the data network (1).

17. An adapter unit (9; 10) as claimed in claim 15, characterized by being implemented as a microcomputer with a processor, a memory, an interface to the telephone network (4), and an interface to an Internet Protocol (IP) network (1).

18. The adapter unit according to claim 15, wherein, the adapter unit is connected between a terminal of the telephone network and the telephone network.

19. A telephone (5, 6) configured for connection to a telephone network (4), characterized in that an adapter unit (9; 10) is incorporated in the telephone (5, 6), said adapter unit comprising:
means for establishing a connection from the telephone (5, 6) to a server (2; 3) of a data network (1) over the telephone network (4);
means for receiving a telephone call of a server (11) of the data network (1);
means for interpreting a telephone number of a caller;
means for comparing the telephone number of the caller with telephone numbers of known servers of the data network;
means for retrieving and/or receiving a data network address of a further adapter unit (10; 9) from the server of the data network (1); and
means for establishing a data call to the further adapter unit (10; 9) through the data network (1),
wherein the adapter unit identifies that the call is arriving from the server of the data network and prevents the telephone from receiving the call until the adapter unit and the further adapter unit establish a connection through the data network by identifying the data network address of the further adapter unit.

20. The telephone according to claim 19, wherein the adapter unit is incorporated in the telephone.

21. A microcomputer comprising a modulator-demodulator (modem) or an ISDN adapter, wherein the modem or the ISDN adapter being configured for connection to a telephone network (4), and including an adapter unit (9, 10), said adapter unit (9, 10) comprising:
means for establishing a connection from the microcomputer to a server (2; 3) of a data network (1) over the telephone network (4);
means for receiving a telephone call of a server (11) of the data network (1);
means for interpreting a telephone number of a caller;
means for comparing the telephone number of the caller with telephone numbers of known servers of the data network;
means for retrieving and/or receiving a data network address of a further adapter unit (10; 9) from the server of the data network (1);
means for establishing a data call to the further adapter unit (10; 9) through the data network (1); and
means for identifying that the call is arriving from the server of the data network and for preventing the microcomputer from receiving the call at the microcomputer prior to the adapter unit and the further adapter unit establishing a connection through the data network by identifying the network address of the further adapter unit via the server.

22. A microcomputer as claimed in claim 21, wherein said microcomputer is a personal computer.

23. A method of activating an inactive terminal (6) of a data network (1), which terminal is connected to a telephone network (4), for establishing a connection through the data network (1) between a further terminal (5) and the terminal (6) to be activated, comprising:

establishing a connection to a server (11) of the data network (1) and transmitting an identifier of the terminal (6) to be activated to the server (11) of the data network (1);

receiving the identifier at the server (11) of the data network (1);

interpreting the identifier at the server (11) of the data network (1) to determine the telephone number of the terminal (11) to be activated;

making a telephone call from the server (11) of the data network (1) through the telephone network (4) to the terminal (6) to be activated;

signaling the identity of the server (11) of the data network through the telephone network (4) to the terminal (6) to be activated; and receiving the telephone call and interpreting the signaling at the terminal (6) to be activated;

wherein, when said terminal (6) to be activated receives the telephone call and interprets the signaling, said terminal (6) to be activated does not accept the telephone call from the server (11) if said terminal (6) to be activated recognizes the signaling as being from the server (11) and wherein the terminal to be activated is a terminal which has not yet established a connection through the data network.

24. The method of activating an inactive terminal according to claim 23, wherein, the terminal to be activated is a terminal which has not yet established a connection through the telephone network.

25. An adapter unit (9) connected between a terminal (5; 6) of a telephone network (4) and the telephone network (4), comprising:

means for establishing a connection from the terminal (5) to a server (2; 3) of a data network (1) over the telephone network (4);

means for receiving a telephone call of a server (11) of the data network (1);

means for interpreting a telephone number of a caller;

means for comparing the telephone number of the caller with the telephone numbers of known servers of the data network; and means for identifying the call arriving from the server of the data network and for preventing the telephone from receiving the call at the telephone prior to the adapter unit and the further adapter unit establishing a connection through the data network by identifying network address of the further adapter unit, wherein the adapter unit (9) does not accept the telephone call from the server (11) of the data network (1) if said means for comparing determines that the telephone number of the caller is a telephone number of a known server of the data network.

26. The adaptor unit according to claim 25, wherein, the adapter unit is connected between a terminal of the telephone network and the telephone network.

\* \* \* \* \*